United States Patent [19]

Whalen et al.

[11] Patent Number: 4,917,611
[45] Date of Patent: Apr. 17, 1990

[54] ION CHAMBER TRAINER

[75] Inventors: R. William Whalen; David P. Bacom, both of San Luis Obispo, Calif.

[73] Assignee: SPEC Consultants, Inc., Trafford, Pa.

[21] Appl. No.: 324,090

[22] Filed: Mar. 16, 1989

[51] Int. Cl.$^4$ .............................................. G09B 9/00
[52] U.S. Cl. ................................................... 434/218
[58] Field of Search ......................................... 434/218

[56] References Cited

U.S. PATENT DOCUMENTS

| | | | |
|---|---|---|---|
| Re. 27,078 | 3/1971 | Shaw et al. | 434/218 |
| 2,900,740 | 8/1959 | Brault et al. | 434/218 |
| 3,208,159 | 9/1965 | Filipov | 434/218 |
| 3,226,847 | 1/1966 | Falk et al. | 434/218 |
| 3,276,143 | 10/1966 | Jaquiss | 434/218 |
| 3,293,777 | 12/1966 | Shaw et al. | 434/218 |
| 3,636,641 | 1/1972 | Daskam | 434/218 |
| 3,643,166 | 2/1972 | McCurnin et al. | 434/218 X |

Primary Examiner—William H. Grieb
Attorney, Agent, or Firm—Daniel C. McKown

[57] ABSTRACT

A training instrument for use in teaching a trainee the proper use of a radioactivity measuring instrument includes a transmitter unit that is held and controlled by an instructor and further includes a receiver unit which is held and operated by the student and which simulates the radioactivity measuring instrument. The instructor selects a level of radioactivity to be measured by the student at a remote site, and that information is transmitted to the receiver unit in a modulated form that is not affected by atmospheric conditions or reflections from surrounding objects. Both the receiver and the transmitter include circuits that simulate the operation of a multirange meter. These circuits employ the most significant bits of a digital representation of the signal to determine which scale should be used, while the remaining digits indicate the magnitude of the signal as read on the selected scale. This technique permits the accurate simulation of both small and large levels of radioactivity over an exceptionally wide range of radioactivity levels.

4 Claims, 4 Drawing Sheets

| 8th and 7th DIGITS | 00 | 01 | 10 | 11 |
|---|---|---|---|---|
| ASSIGNED METER RANGE | 0 - 5 | 5 - 50 | 50 - 500 | 500 - 5000 |

| 8th and 7th DIGITS | | 00 | 01 | 10 | 11 |
|---|---|---|---|---|---|
| | PROPER METER RANGE | 0 - 5 | 5 - 50 | 50 - 500 | 500 - 5000 |
| ACTUAL METER RANGE | 0 to 5 | APPLY SIGNAL TO METER | APPLY PEGGING VOLTAGE TO METER | APPLY PEGGING VOLTAGE TO METER | APPLY PEGGING VOLTAGE TO METER |
| | 5 to 50 | APPLY 1/10 th SIGNAL TO METER | APPLY SIGNAL TO METER | APPLY PEGGING VOLTAGE TO METER | APPLY PEGGING VOLTAGE TO METER |
| | 50 to 500 | APPLY 1/100 th SIGNAL TO METER | APPLY 1/10 th SIGNAL TO METER | APPLY SIGNAL TO METER | APPLY PEGGING VOLTAGE TO METER |
| | 500 to 5000 | APPLY 1/100 th SIGNAL TO METER | APPLY 1/100 th SIGNAL TO METER | APPLY 1/10 th SIGNAL TO METER | APPLY SIGNAL TO METER |

FIG. 4

ION CHAMBER TRAINER

BACKGROUND OF THE INVENTION

1. Field of the Invention

The present invention is in the field of training apparatus, and specifically relates to apparatus for training technicians in the use of an ion chamber radiation detector while avoiding the use of radioactive material.

2. The Prior Art

In the present invention, the student holds an instrument which simulates an ion chamber and that includes a meter on which the intensity of the radiation is displayed. The instrument held by the student is not a functioning ion chamber, because that would necessitate the use of radioactive materials. Instead, the instrument held by the student includes a radio receiver. The radio receiver receives a signal that is sent by a radio transmitter that is controlled by the instructor. The instructor's transmitter has controls that the instructor manipulates to alter the amount and type of radiation simulated by altering the transmitted signal as the student moves about.

In U.S. Pat. No. 3,636,641, Daskam shows a receiver instrument in which an output signal is produced which is proportional to the signal strength received from the transmitter. Because the signal strength at a particular location is affected by surrounding objects, the signal received by the student's instrument is not entirely under the control of the instructor.

The systems shown in U.S. Pat. No. 3,276,143 of Jaquiss and U.S. Pat. No. 3,293,777 of Shaw, et al. are somewhat similar. Both of these patents show the use of radio transmitters that use directional antennas to produce an elongated field strength pattern, which simulates a possible radiation fallout pattern. In addition, hotspot transmitters are located within the primary radiation pattern. These systems rely on the fall-off of field strength to represent the manner in which the radio-activity diminishes with distance from the various sources. Once the apparatus has been set up, there appears to be minimal change introduced by the instructor, and the students are basically engaged in mapping the field strength of the radio signals (i.e., the antenna pattern).

Two other patents, namely U.S. Pat. No. 3,208,159 of Filipov and U.S. Pat. No. 2,900,740 of Brault, et al. show systems which work on a completely different principle from the patents discussed above. In these patents, a phosphor in powdered form is used to simulate radioactive material. The phosphor is illuminated by an instrument carried by the student, and the phosphor fluoresces at a different wavelength that is detected by an optical detector in the student's instrument. The concentration of the phosphor determines the strength of the signal displayed on the instrument. Unlike the inventions of these two patents, the present invention does not require the use of a phosphor.

The inventions in the above patents may all be characterized as operating on an analog principle, in which the magnitude of some physical variable is measured and displayed on the instrument carried by the student. The magnitude of the physical variable is not entirely under the instructor's control, and in some instances this can lead to an unrealistic simulation. As will be seen below, the present invention operates on a different principle, which permits a more direct control by the instructor, and a higher degree of realism.

SUMMARY OF THE INVENTION

It is an object of the present invention to provide an improved device for training a student in the proper use of a radioactivity monitoring instrument of the kind in which an instructor uses a radio transmitter to transmit a signal that defines the level of radioactivity being simulated and in which the student carries and operates a radio receiver that simulates a radioactivity monitoring instrument. In the apparatus of the present invention, it is possible for the instructor to check the accuracy of the student's measurements by comparing the level of radioactivity measured by the student with the corresponding level transmitted by the instructor. In accordance with the present invention, the information regarding the simulated level of radioactivity is transmitted by the instructor in a form that renders the transmitted signal independent of atmospheric conditions and reflections from surrounding objects, which would otherwise alter the transmitted signal.

It is a further objective of the present invention to provide an apparatus for training in the monitoring of radioactivity without the use of actual radioactive materials. Further, in the present invention, unlike certain systems used in prior art, it is not necessary to scatter phosphors or other chemicals about the landscape to simulate the radioactive material.

It is a further object of the present invention to provide apparatus in which low levels of radioactivity as well as high levels of radioactivity can be accurately simulated. In accordance with the present invention, the dynamic range of a single range meter is extended by circuitry which simulates the operation of a multi-range meter, so that low-level variations can be measured with the same relative accuracy as high-level variations.

BRIEF DESCRIPTION OF THE DRAWINGS

FIGS. 3(a) through 3(d), is a series of interrelated graphs and tables illustrating the operation of the circuits of FIGS. 1 and 2; and, FIG. 4 is a table describing the operation of a portion of the circuit of FIG. 2.

DETAILED DESCRIPTION OF THE PREFERRED EMBODIMENT

Figure 1:
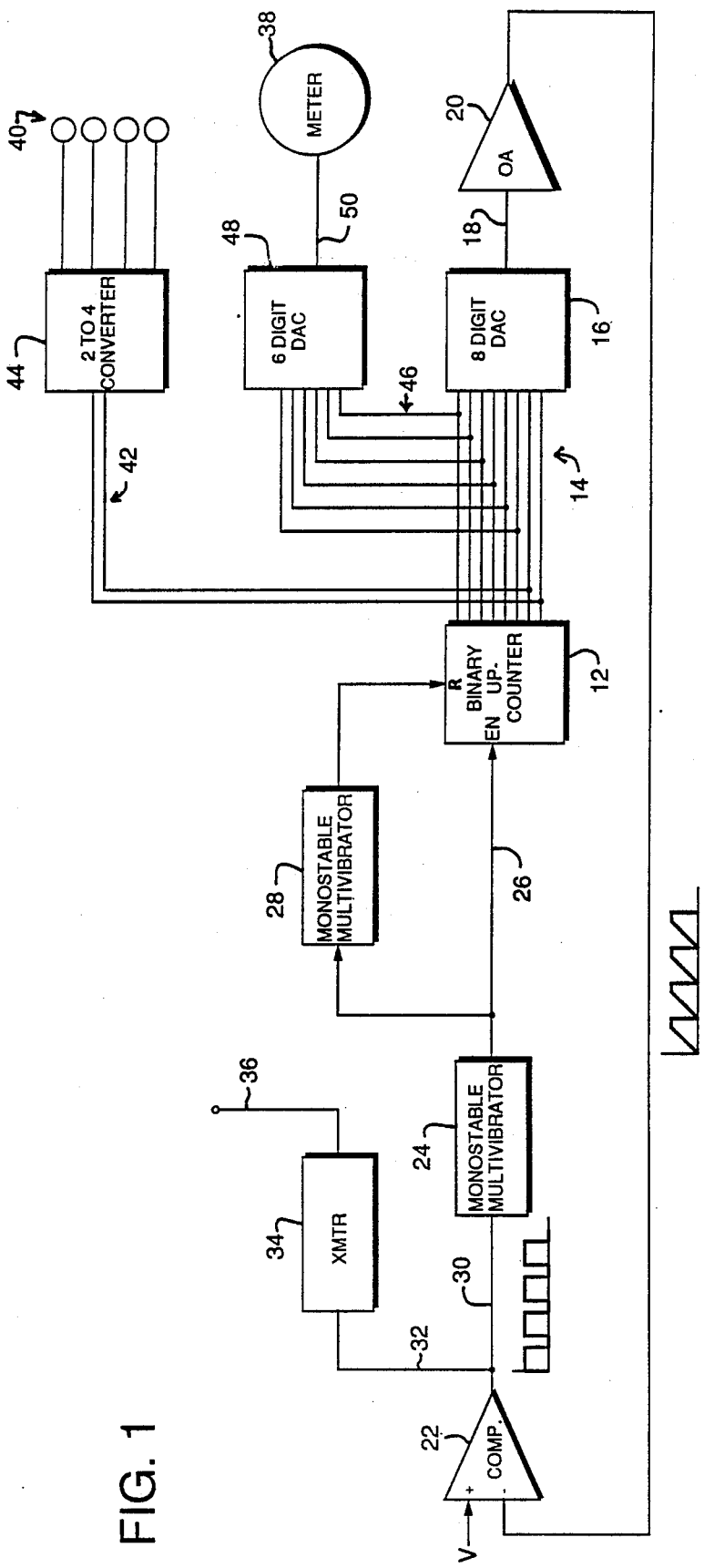
FIG. 1 is a block diagram showing the transmitter signal processing circuit in a preferred embodiment.

As described above, the present invention was conceived of as apparatus for training persons in the use of a radioactivity measuring device. The training is accomplished by use of a receiver which the trainee holds in his hand and operates, and by a transmitter which the instructor holds and controls. The transmitter includes a knob connected to a potentiometer. The instructor controls the simulated intensity of the radioactivity by adjusting the knob, and the transmitter sends forth a modulated signal, the modulations of which carry the information regarding the simulated intensity of radioactivity. The trainee carries the receiver, which is packaged to simulate the radiation-measuring device, and which receives the transmitted signal and converts it to a reading on a meter on the receiver that presents the simulated level of radioactivity. The instructor may vary the simulated intensity of the radioactivity as the trainee moves about. Both the receiver and the transmitter operate from internal batteries. From this description, it is clear that the apparatus could be used to train a person in the use of a variety of apparatus not necessarily related to radioactivity.

In the transmitter, a clock (not shown) drives the binary up-counter 12. In the embodiment shown, the count of the counter is available on the lines 14 in parallel binary form, each of the lines 14 representing a binary digit. The binary count is applied via the lines 14 to the eight-digit digital-to-analog converter (DAC) 16, which produces on the line 18 a voltage whose magnitude is proportional to the numerical value of the binary count.

As the clock drives the binary up-counter 12, the accumulated total increases linearly so that a ramp voltage signal is present on the line 18. This signal is applied to the negative input of the comparator 22 via the operational amplifier 20.

The potentiometer controlled by the instructor is used to produce the voltage V that can range between $V_{min}$ and $V_{max}$ as best seen in FIG. 3(a). The voltage V is applied to the positive input of the comparator 22. Compared to the speed at which the ramp voltage is being generated, the voltage V may be regarded as a constant. Initially, the output of the comparator 22 is HIGH because V is greater than the ramp voltage applied to the negative input. However, as the ramp voltage increases, a time is reached when it equals the voltage V. When that happens, the output of the comparator 22 switches to LOW, and this transition causes the monostable multivibrator 24 to generate a LOW pulse of known duration, which is applied via the line 26 to disable the binary up-counter 12 for the same known duration. The monostable multivibrator 28 resets the binary up-counter, and the count begins again.

In this manner there is generated on the line 30, a train of pulses similar to that shown in the drawing and in which the duration of the HIGH state is proportional to the applied voltage V and in which the duration of the LOW state is constant as determined by the monostable multivibrator 24. This signal is applied via the line 32 to the transmitter 34, which broadcasts it through the antenna 36. The signal applied on the line 32 modulates the amplitude of a high frequency carrier, so that the transmitted signal consists of successive bursts of the carrier.

It is important for the instructor to have a visual indication of the voltage V that represents the simulated intensity of radioactivity. This visual indication is provided on the meter 38 in conjunction with the range-indicating LEDs 40.

If the analog signal on the line 18 were applied directly to the meter 38, the entire represented range of radioactivity levels, ranging, say, from 0 to 5,000 mR/hr could be indicated by a full-scale movement of the needle of the meter 38. Unfortunately, this would render small changes, such as 5 mR/hr to 10 mR/hr practically unobservable since such a change would correspond to only 0.1 percent of the full-scale movement. Nevertheless, for purposes of monitoring radioactivity, the difference between 5 mR/hr and 10 mR/hr could be significant in terms of long-term exposure or in connection with mapping the distribution of radioactive material. Therefore, the more conventional approach, which would be achieved by applying the signal on the line 18 directly to the meter 38 is undesirable or unacceptable for radioactivity monitoring.

To overcome this shortcoming of the more conventional approach, the present inventor devised the technique used in the preferred embodiment and shown in FIG. 1. The eight lines 14 carry signals in parallel that represent an eight-digit binary number, with the least significant digit on the uppermost one of the lines 14 and the most significant digit on the lowermost one of the lines 14. In accordance with the preferred embodiment, the two most significant digits are routed via the lines 42 to the 2 to 4 converter 44, and the remaining six digits are routed via the lines 46 to the six-digit DAC 48.

During 30, the creation of each of the pulses on the line 30, the output of the eight-digit DAC 16 on the line 18 increases in the linear manner shown in FIG. 3(b). Concurrently, the output of the six-digit DAC 48 on the line 50 executes four ramps as shown in FIG. 3(d). Corresponding to each of these four ramps, the needle of the meter 38 will sweep through its full range of movement four times.

Meanwhile, the two most significant digits, on the lines 42 will successively indicate which of the four ramps is being applied to the meter 38. One of the LEDs 40 is always lit to provide a visual indication of which ramp is being used.

Figure 3C:
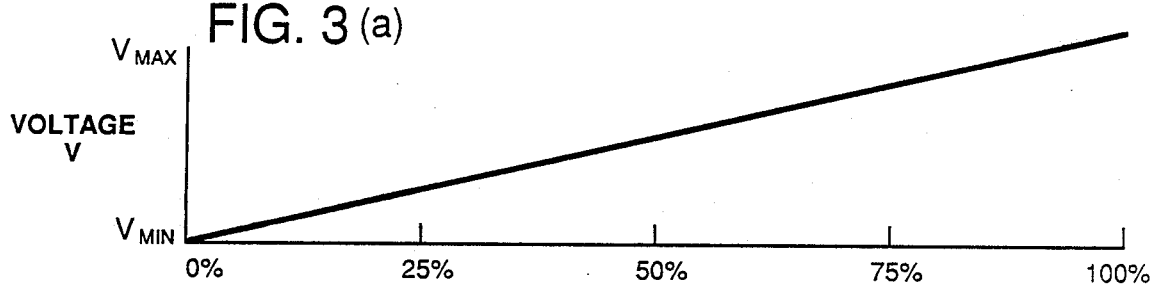
Figure 3C:
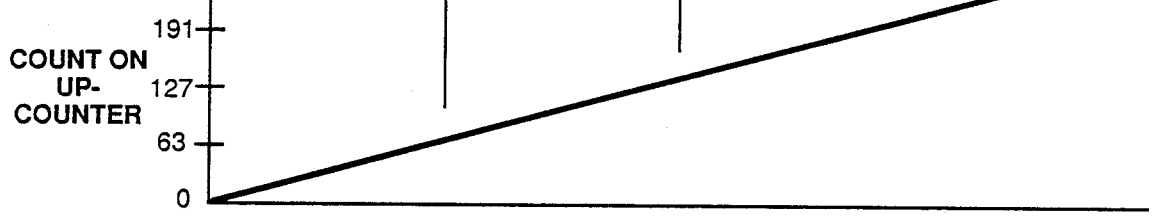
Figure 3:
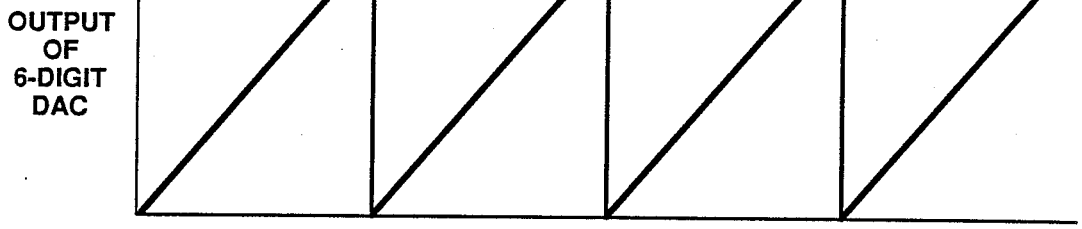
FIG. 3, including

As shown in FIG. 3(c), a different meter range can be assigned to each of the ramps. This assignment has the advantage of providing greater sensitivity for the smaller values, and of reducing the sensitivity at the larger values. For example, on the second meter range (5–50) the difference between a reading of 5 mR and 10 mR occupies approximately 11 percent of the full scale range. Thus, the arrangement described here permits the instructor to know at a glance which scale of the meter to read, and it enables him to set in small changes in the simulated radiation level without having to make accurate but very tiny movements of the knob of the potentiometer.

Figure 2:
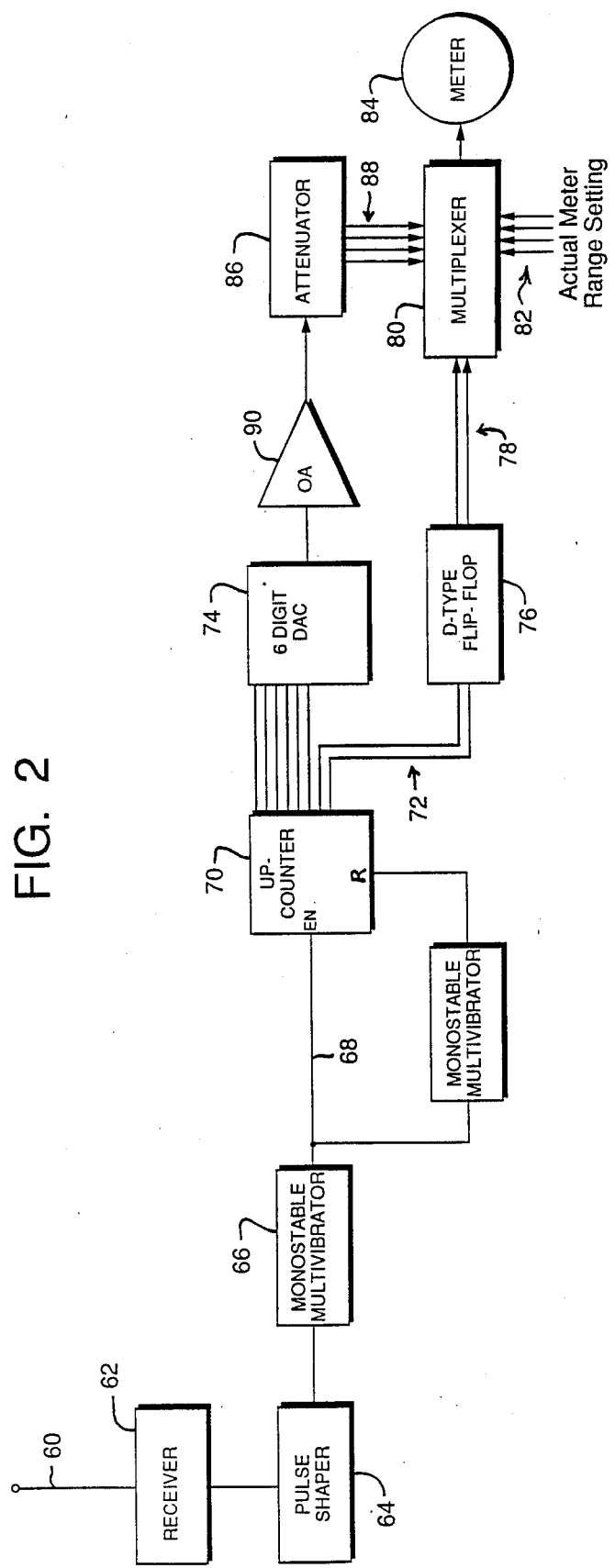
FIG. 2 is a block diagram showing the receiver signal processing circuit in the preferred embodiment.

Turning now to the receiver data processing circuits shown in FIG. 2, the broadcast signal is intercepted by the antenna 60 and detected by the receiver 62, which applies the detected signal to the pulse shaper 64 to trigger the monostable multivibrator 66. The latter amends the pulse train to have the same shape as that on line 26 in the transmitter (FIG. 1).

The present inventor recognized at this point that the output on the monostable multivibrator 66 could be decoded into a first signal presenting the desired deflection of the needle of a meter, and a second signal used to determine the correct scale of the instrument. In accordance with the present invention, the signal on the line 68 is applied to the ENABLE input of the up-counter 70, which is driven by a clock preferably having the same frequency as the clock used to drive the up-counter 12 of FIG. 1.

The six least significant digits of the output of the up-counter 70 are applied to the six digit DAC 74, while the two most significant digits are applied via the lines 72 to the D-type flip-flop 76, which serves to latch in the digits. The lines 78 provide an ongoing representation of the two most significant digits, and these are applied to the multiplexer 80 as control inputs.

Also applied to the multiplexer as control inputs is a signal on one of the four lines 82, which signal indicates which range the meter 84 is set on.

The output of the six-digit DAC 74 is applied via the operational amplifier 90 to the attenuator 86. The latter produces on the four lines 88 respectively, the following signals: the unattenuated signal; the signal attenuated by a factor of ten; the signal attenuated by a factor of one hundred; and a voltage sufficiently large to peg the meter 84 without damaging it. These signals are present simultaneously and continuously on the lines 88. The multiplexer 80 selects which of these four signals is to be applied to the meter 84 in relation to the control signals on the lines 78 and on the lines 82. The truth table for the multiplexer 80 is shown in FIG. 4.

In this manner, the trainee is given experience in dealing with the various situations that arrise in the practical use of a radiation measuring device (or of a multi-range meter). For example, the quantity to be measured may be satisfactorily measured on the scale to which the meter is set, or the quantity may be so large as to be off scale, thereby indicating that a change of range is necessary; or, the quantity to be measured may be small relative to the scale on which the meter is set, making it desirable to reset the meter to a more sensitive scale. After the trainee has set the meter 84 on the most appropriate scale, he should be able to read the same number of mR/hr as the instructor transmitted.

Thus, unlike systems previously used, in the present invention, the signal is transmitted in a form that is independent of the field strength of the signal transmitted, so that the reading obtained by the trainee is not influenced by atmospheric conditions or reflections from nearby objects. For the same reason, it is possible for the instructor to check a series of readings obtained by the trainee to determine whether they match the signals transmitted by the instructor, and in this way the instructor can determine whether the trainee is using his instrument correctly.

The foregoing detailed description is illustrative of on embodiment of the invention, and it is to be understood that additional embodiments thereof will be obvious to those skilled in the art. The embodiments described herein together with those additional embodiments are considered to be within the scope of the invention.

What is claimed is:

1. A transmitter for use in training persons in the use of a radioactivity measuring instrument of the type in which an instructor sets a simulated level of radioactivity to be measured into a radio transmitter, characterized in that the simulated level of radioactivity transmitted by the instructor can be read by the instructor for comparison against the simulated level of radioactivity measured by the trainee, and further characterized in that both low levels and high levels of radioactivity can be simulate with equal percentage accuracy, said transmitter comprising in combination:
   first means responsive to a simulated level of radioactivity set in by the instructor to generate and transmit a train of pulses in which the width of each pulse is related to the simulated level of radioactivity and the spacing between successive pulses is constant;
   second means connected to said first means and responsive to said train of pulses for producing a multi-digit digital representation of the simulated level of radioactivity;
   a meter having various scales;
   third means connected to said second means and responsive to the first N most significant digits of the digital representation for indicating which scale of the meter the simulated level of radioactivity should be read on; and,
   fourth means connected to said second means and responsive to the remaining digits of said digital representation for producing an analog signal from those digits and applying the analog signal to said meter, so as to provide the instructor with a quantitative indication of the magnitude of the transmitted simulated level of radioactivity.

2. A receiver for use in training persons in the use of a radioactivity measuring instrument of the type in which the trainee carries a radio receiver that he uses to receive and to measure a simulated level of radioactivity transmitted by a radio transmitter controlled by an instructor, and characterized in that both low levels and high levels of radioactivity can be simulated with equal percentage accuracy, said receiver comprising in combination:
   first means for receiving and detecting a train of pulses transmitted by the transmitter of the instructor;
   second means connected to said first means and responsive to the train of pulses for producing a M-digit digital representation of the simulated level of radioactivity;
   a meter having a number of range settings under control of the trainee;
   third means connected to said second means and responsive to the first N most significant digits of the digital representation of the simulated level of activity for determining the proper meter range for reading the meter;
   fourth means connected to said second means and responsive to the remaining M minus N digits to produce an analog signal;
   fifth means connected to said fourth means to receive the analog signal and connected to said third means to receive the proper meter range, and connected to said meter to receive the actual range setting of the meted, for producing replicas of the analog signal attenuated by preset factors, and responsive to the determined proper meter range and to the actual meter range setting to select one of the replicas of the analog signal in accordance with a predetermined truth table, and to apply the selected one of the replicas to the meter.

3. Apparatus for use in training persons in the use of a radioactivity measuring instrument of the type in which an instructor sets a simulated level of radioactivity to be measured into a radio transmitter and in which the trainee carries a radio receiver that he uses to receive and to measure the simulated level of radioactivity transmitted by the radio transmitter, and characterized in that the simulated level of radioactivity measured by the trainee can be verified against the level set by the instructor because the transmitted signal is not altered by atmospheric conditions or by reflections from surrounding objects, and further characterized in that both low levels and high levels of radioactivity can be simulated with equal percentage accuracy, said apparatus comprising in combination:
   a transmitter including
      first means responsive to a simulated level of radioactivity set in by the instructor to generate and transmit a train of pulses in which the width of each pulse is related to the simulated level of radioactivity and the spacing between successive pulses is constant;
      second means connected to said first means and responsive to said train of pulses for producing a M-digit digital representation of the simulated level of radioactivity;

a meter having more than one meter range;

third means connected to said second means and responsive to the first N most significant digits of the digital representation to indicate a meter range;

fourth means connected to said second means and connected to said meter, and responsive to the remaining M-N digits of the digital representation for producing an analog signal and for applying the analog signal to said meter so as to provide the instructor with a quantitative indication of the magnitude of the simulated level of radioactivity;

a receiver including fifth means for receiving and detecting the train of pulses transmitted by said transmitter;

sixth means connected to said fifth means and responsive to the train of pulses to produce a X-digit digital representation of the simulated level of radioactivity;

seventh means connected to said sixth means and responsive to the first Y most significant digits of the digital representation to determine a proper meter range;

eighth means connected to said sixth means for converting the remaining X-Y digits to an analog signal;

ninth means connected to said eighth means for receiving the analog signal, connected to said seventh means for receiving the proper meter range, and connected to said meter for receiving the actual range setting of the meter, for producing replicas of the analog signal attenuated by preset factors, and responsive to the determined proper meter range and to the actual meter range setting of said meter to select one of the replicas of the analog signal in accordance with a predetermined truth table, and to apply the selected one of the replicas to said meter.

4. A method for training a person in the use of a radioactivity measuring instrument cf the type in which an instructor sets a simulated level of radioactivity to be measured into a radio transmitter and in which a trainee carries a radio receiver that he uses to receive and to measure the simulated level of radioactivity transmitted by the radio transmitter, and characterized in that the simulated level of radioactivity measured by the trainee can be verified against the levels set by the instructor because the transmitted signal is not altered in transmission by atmospheric conditions or by reflections from surrounding objects, and further characterized in that both low levels and high levels of radioactivity can be simulated with equal percentage accuracy, said method comprising the sets of:

generating and transmitting a train of pulses in which the width of each pulse is related to the simulated level of activity chosen by the instructor and the spacing between successive pulses is constant;

producing a N digit digital representation of the simulated level of radioactivity;

using the M most significant digits of the digital representation to indicate a meter range;

converting the remaining N-M digits to an analog signal;

applying the analog signal to a meter, whereby the instructor is provided with a quantitative indication of the magnitude of the simulated level of radioactivity;

receiving and detecting the train of pulses transmitted by the instructor's transmitter;

producing from the received pulses a X-digit digital representation of the simulated level of activity;

using the first Y most significant digits of the digital representation to determine a proper meter range;

converting the remaining X-Y digits to an analog signal;

determining the actual range setting of the meter;

producing replicas of the analog signal attenuated by preset factors;

selecting one of the replicas of the analog signal in response to the actual meter range setting and the proper meter range and in accordance with a predetermined truth table;

applying the selected one of the replicas to the meter; and, comparing the simulated level of radioactivity determined by the trainee with the simulated level of radioactivity set by the instructor to verify that the trainee has used the simulated radioactivity measuring instrument correctly.

* * * * *